United States Patent (10) Patent No.: US 11,099,129 B2
Weber et al. (45) Date of Patent: Aug. 24, 2021

(54) SPATIALLY RESOLVED STANDOFF TRACE CHEMICAL SENSING USING BACKWARDS TRANSIENT ABSORPTION SPECTROSCOPY

(71) Applicant: BROWN UNIVERSITY, Providence, RI (US)

(72) Inventors: Peter M. Weber, Barrington, RI (US); Fedor Rudakov, Cambridge, MA (US)

(73) Assignee: Brown University, Providence, RI (US)

( * ) Notice: Subject to any disclaimer, the term of this patent is extended or adjusted under 35 U.S.C. 154(b) by 0 days.

(21) Appl. No.: 16/647,382

(22) PCT Filed: Sep. 14, 2018

(86) PCT No.: PCT/US2018/051153
§ 371 (c)(1),
(2) Date: Mar. 13, 2020

(87) PCT Pub. No.: WO2019/164552
PCT Pub. Date: Aug. 29, 2019

(65) Prior Publication Data
US 2021/0033527 A1 Feb. 4, 2021

Related U.S. Application Data

(60) Provisional application No. 62/620,787, filed on Jan. 23, 2018, provisional application No. 62/558,634, filed on Sep. 14, 2017.

(51) Int. Cl.
G01N 21/39 (2006.01)

(52) U.S. Cl.
CPC ....... G01N 21/39 (2013.01); G01N 2021/392 (2013.01); G01N 2021/396 (2013.01); G01N 2201/06113 (2013.01)

(58) Field of Classification Search
CPC .. G01N 21/39; G01N 21/3504; G01N 21/031; G01N 21/47; G01N 21/53;
(Continued)

(56) References Cited

U.S. PATENT DOCUMENTS 4,489,239 A 12/1984 Grant et al.
4,986,658 A 1/1991 Kim
(Continued)

FOREIGN PATENT DOCUMENTS

CN 101952709 A 1/2011
CN 103616571 A 3/2014
(Continued)

OTHER PUBLICATIONS

Stark Spectroscopy on Photoactive Yellow Protein, E46Q, and a Nonisomerizing Derivative, Probes Photo-Induced Charge Motion; L.L.Premvardhan et al.; Biophysical Journal, vol. 84, Issue 5, May 2003, pp. 3226-3239.
(Continued)

Primary Examiner — Hoa Q Pham
(74) Attorney, Agent, or Firm — Adler Pollock & Sheehan P.C.

(57) ABSTRACT

A system includes a first laser beam including a pulsed laser emanating from the instrument propagates in the air, wherein the first lase beam is tuned to the wavelength at which a target chemical absorbs, its pulses bringing molecules to an excited state, a second laser beam used to probe target chemicals by transient absorption spectroscopy, wherein the second laser beam is pulsed or continuous, and a detector.

6 Claims, 3 Drawing Sheets

(58) Field of Classification Search
CPC ... G01N 2021/396; G01N 2021/06113; G01N 2021/392; G01N 2201/0697; G01N 15/0205; G01J 3/4412; G01J 3/40; G01J 3/453; G01J 3/10; G01J 3/447
USPC ........ 356/335–343, 300, 328, 318, 432–440; 250/339.11, 338.5, 339.13, 339.12
See application file for complete search history.

(56) References Cited

U.S. PATENT DOCUMENTS

| | | | |
|---|---|---|---|
| 5,963,335 | A | 10/1999 | Boutelle |
| 6,384,951 | B1 | 5/2002 | Basiji et al. |
| 7,220,972 | B2 | 5/2007 | Weber |
| 7,312,452 | B2 | 12/2007 | Klingenberg et al. |
| 7,586,094 | B2 | 9/2009 | Liu et al. |
| 7,760,342 | B2 * | 7/2010 | Zanni ............... G01J 3/433 356/51 |
| 8,164,742 | B1 | 4/2012 | Carrieri et al. |
| 9,001,320 | B2 * | 4/2015 | Harel ............... G01J 3/10 356/300 |
| 10,024,788 | B2 * | 7/2018 | Feitisch ............ G01J 3/0208 |
| 10,620,048 | B2 * | 4/2020 | Allison ............. G01J 3/02 |
| 2002/0093653 | A1 | 7/2002 | Detalle et al. |
| 2008/0204718 | A1 | 8/2008 | Trainer |
| 2008/0258071 | A1 | 10/2008 | Bradley et al. |
| 2015/0144297 | A1 | 5/2015 | Juha et al. |
| 2017/0248517 | A1 | 8/2017 | Scherer et al. |
| 2019/0056313 | A1 * | 2/2019 | Miller ............... G01J 3/0264 |

FOREIGN PATENT DOCUMENTS

| | | |
|---|---|---|
| EP | 1560058 A3 | 8/2005 |
| JP | 6033222 B2 | 10/2013 |
| WO | 2013007726 A1 | 1/2013 |
| WO | 2016179318 A1 | 11/2016 |
| WO | 2017161247 A1 | 9/2017 |

OTHER PUBLICATIONS

Ultrafast transient absorption spectroscopy: principles and application to photosynthetic systems; Rudi Berera et al.; Photosynth Res. Sep. 2009; 101(2-3): 105-118. Published online Jul. 4, 2009. doi: 10.1007/s11120-009-9454-y.

International Search Report and Written Opinion received in International Application No. PCT/US2018/051153, dated Sep. 5, 2019, 6 pages.

Fedor Rudakov, Joseph D. Geiser, and Peter M. Weber, "Spatially resolved standoff trace chemical sensing using backwards transient absorption spectroscopy," Opt. Lett. 43, 1279-1282 (2018).

* cited by examiner

SPATIALLY RESOLVED STANDOFF TRACE CHEMICAL SENSING USING BACKWARDS TRANSIENT ABSORPTION SPECTROSCOPY

CROSS REFERENCE TO RELATED APPLICATIONS

This application is a national phase filing under 35 U.S.C. § 371 of International Application No. PCT/US2018/051153 filed Sep. 14, 2018, which claims benefit from U.S. Provisional Patent Application No. 62/558,634, filed Sep. 14, 2017, and U.S. Provisional Patent Application No. 62/620,787, filed Jan. 23, 2018, the contents of which are incorporated herein by reference in their entireties.

STATEMENT REGARDING GOVERNMENT INTEREST

This Invention was made with government support under Grant No. W911NF-17-1-0256 awarded by the Army Research Office and Grant No. HDTRA1-14-1-0008 awarded by the Defense Threat Reduction Agency (DTRA). The government has certain rights in the invention.

BACKGROUND OF THE INVENTION

The invention generally relates to spectroscopy, and more specifically to spatially resolved standoff trace chemical sensing using backwards transient absorption spectroscopy.

In general, the spatially resolved and substance specific detection of chemical vapors in open air is of paramount importance for environmental, security and health monitoring. Most optical sensing techniques reveal path-averaged concentrations of the target chemicals. Yet the knowledge of chemical vapor spatial distributions is important to separate and independently quantify emissions from multiple sources and to discriminate between the chemical source and the background.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a system including a first laser beam comprising a pulsed laser emanating from the instrument propagates in the air, a second laser beam used to probe target chemicals by transient absorption spectroscopy, and a detector.

In another aspect, the invention features a system including a first laser beam including a pulsed laser emanating from the instrument propagates in the air, wherein the first lase beam is tuned to the wavelength at which a target chemical absorbs, its pulses bringing molecules to an excited state, a second laser beam used to probe target chemicals by transient absorption spectroscopy, wherein the second laser beam is pulsed or continuous, and a detector.

Embodiments of the invention may have one or more of the following advantages.

A technique for the spatially resolved and molecule-specific detection of chemical vapors is presented. The chemical specificity arises from a transient absorption spectrum where an ultraviolet pulse excites the molecule to a Rydberg level, and a near infrared or visible probe pulse records a transient absorption spectrum. By recording the Near Infrared Reflectance (NIR) pulse reflected off a random, distant object and measuring the elapsed time between emission of the UV pulse and the absorption of a counter-propagating NIR pulse, the distance of the absorber can be obtained.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

DETAILED DESCRIPTION

Figure 1:
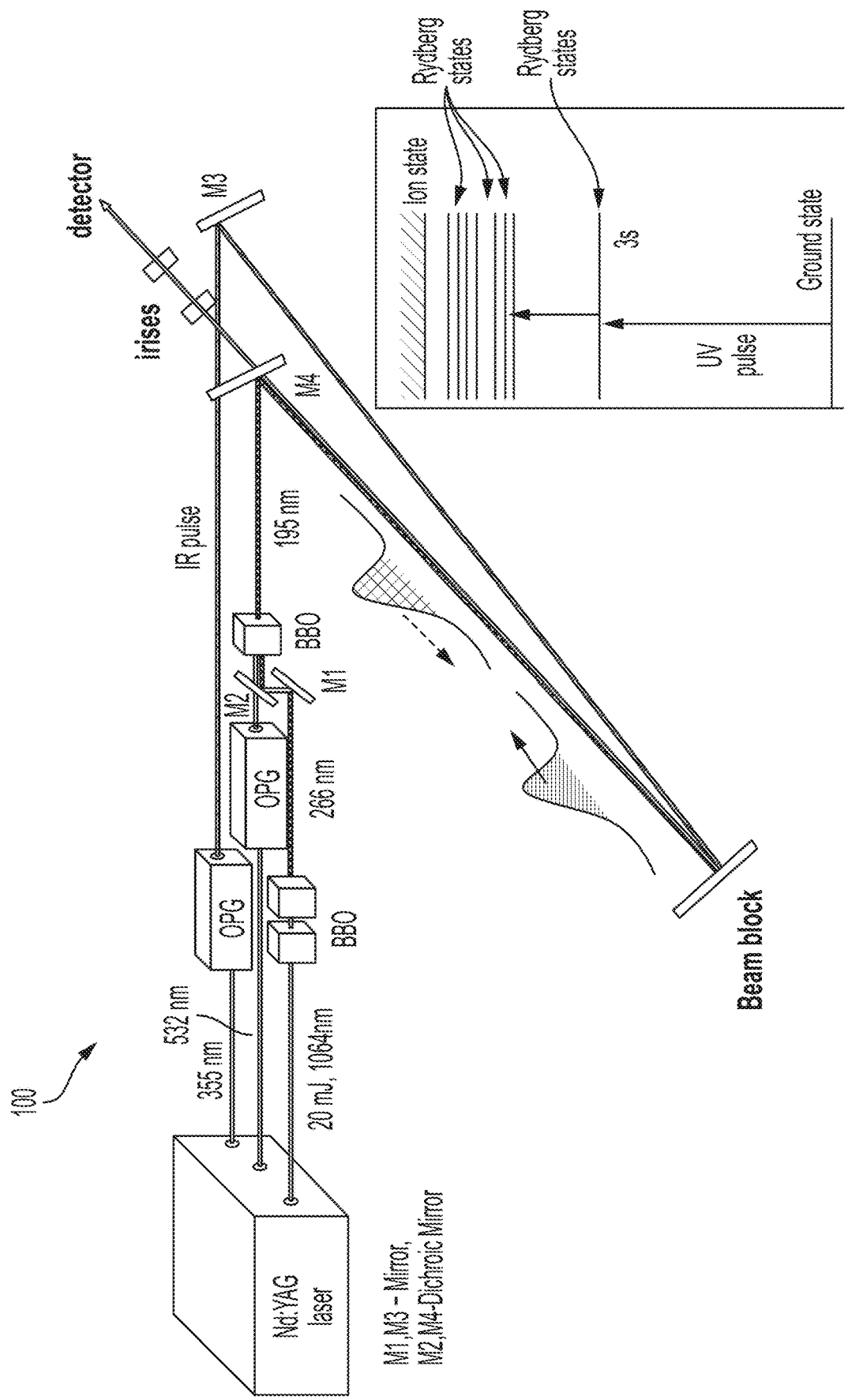
FIG. 1 is a block diagram of an experimental setup.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

In general, prior measurements of spatial distributions of chemicals vapors use Differential Absorption Lidar (DIAL). DIAL utilizes a laser source that operates at two slightly different wavelengths—one wavelength is tuned to a resonant transition in the target chemical while the other is off-resonant from any transitions in the molecule. Since the wavelengths are chosen to be close to each other, scattering and absorption by the atmosphere is considered to be the same for both wavelengths. The difference in the returned signals then represents the absorption by the target chemical. By measuring the returned signals as a function of time the distribution of the chemical along the laser beam pathway can be revealed. This approach is usually referred to as Integrated Path Differential Absorption (IPDA).

DIAL usually probes vibrational transitions in the target chemicals. Such transitions have fairly small absorption cross-sections, limiting the sensitivity of the technique. Furthermore, the complexity of vibrational spectra scales very unfavorably with the molecular size, making the detection of polyatomic molecules in complex environments very challenging. So far DIAL has mostly been applied to detection of small molecules such as $H_2O$, $CO_2$, and $CH_4$2, 3,4,5. The spatial resolution of the technique is usually on the order of several meters or more.

The present invention uses transitions between molecular Rydberg states (instead of vibrational transitions) to fingerprint molecular structures; the present invention is referred to herein as Backwards Transient Absorption Spectroscopy (BTAS), which enables molecule-specific chemical vapor distribution imaging with millimeter spatial resolution.

Rydberg Fingerprint Spectroscopy

Electronic transitions in molecules are characterized by absorption cross-sections that are very large compared to vibrational transitions. They also are in UV/VIS/NIR wavelength ranges for which high power lasers and highly sensitive detectors are readily available. This makes electronic transitions attractive for chemical sensing applications. Yet in polyatomic molecules, electronic transitions (usually probed via UV-VIS absorption spectroscopy) often have very broad and featureless spectra that are poorly suited for chemical identification.

In contrast, molecular Rydberg states have been shown to provide detailed fingerprints of molecular structures, giving rise to a structural identification method we refer to as Rydberg Fingerprint Spectroscopy (RFS). Molecular Rydberg states are excited electronic states with wave functions resembling those of a hydrogen atom. Unlike transitions between valance states, Rydberg-Rydberg and Rydberg-ion transitions reveal highly resolved and purely electronic spectra. Since Rydberg electrons do not contribute substantially to the molecular bonding, the potential energy surfaces and subsequently vibrational wavefunctions in different Rydberg states are almost identical. Vibrational wavefunctions in different Rydberg states are thus orthogonal to each other so that the Frank-Condon envelope for Rydberg-Rydberg or Rydberg-ion transitions are confined to a very narrow band. Another advantage of Rydberg spectroscopy is that the number of Rydberg states in molecules mimics those of atoms.

Therefore, the complexity of Rydberg spectra does not scale with the molecular size, making the technique well suited for detection of polyatomic organic molecules.

RFS allows for differentiation between different isomeric and even conformeric forms of molecules. Rydberg spectra can be acquired remotely in air using photoionization followed by the detection of the laser-induced plasma with microwave radiation. While workable, this approach does not reveal the spatial distribution of the target chemicals. Furthermore, the scalability of that technique for long-range sensing remains challenging since the recorded microwave backscattering signals scale with distance as $R^{-4}$.

Backwards Transient Absorption

The present invention allows for range-resolved chemical sensing with millimeter spatial resolution. In our design, the probe NIR pulse gets scattered by some reflection geometry (e.g. a wall of a building) located behind the target and the backscattered photons are utilized to acquire transient absorption spectra.

In FIG. 1, and exemplary experimental setup 100 is shown. The 195 nm pump and the NIR probe pulsed laser beams illuminate the same spot on a beam block, which is used to randomly scatter the NIR light. This block simulates a wall, or a spot in the landscape, as would apply in real-life applications. Some of the scattered NIR photons counter-propagate the 195 nm pump pulse, which is time-delayed with respect to the NIR pulse. The NIR photons thus overlap with the pump pulse at some position that is determined by the time delay between the pump and the probe pulses. The 195 nm pump pulse excites the acetone molecules to the 3 s Rydberg state.

Figure 2:
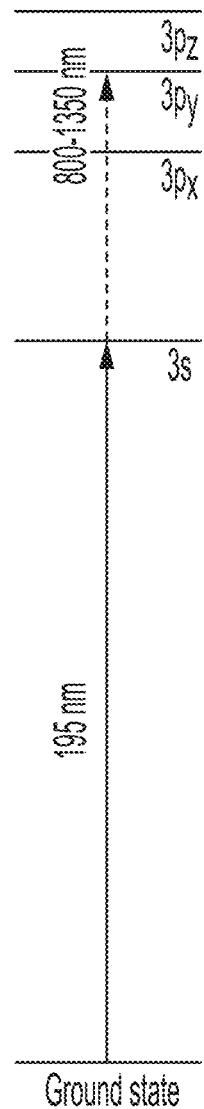
FIG. 2 is an exemplary graph.

As shown in FIG. 2, the NIR pulse probes transitions between the 3 s and the 3 p states. If the vapors are present at the position where the pump and the probe pulses overlap in time, the transient absorption signal is observed. By varying the time delay between the pump and the probe pulses the relative concentration of acetone vapors is revealed. The spatial resolution of the technique is determined by the laser pulse duration and the lifetime of the Rydberg state. In our experiments on acetone, the laser pulses are ~15 ps in duration and the 3 s Rydberg state has a lifetime of 3.2 ps.

Two measurements were conducted. In the first experiment we utilized a single, room temperature acetone source with a 2 mm opening (not shown in FIG. 1). In the second experiment we measured two room temperature acetone sources, each with a 0.5 mm opening, separated by approximately 1". In both experiments the laser beam was centered ~0.5 mm above the opening. All the measurements were conducted in open air. The time delay between the laser pulses was scanned with the step size of 6.67 ps (corresponding to 1 mm step on the linear stage). The wavelength of the probe pulse was scanned with 5 nm steps. Since the pump and the probe photons counter-propagate each other, a translation of the position of the optical delay stage by 1 mm results in a shift of the spot where the pump and probe pulses overlap also by 1 mm.

Figure 3:
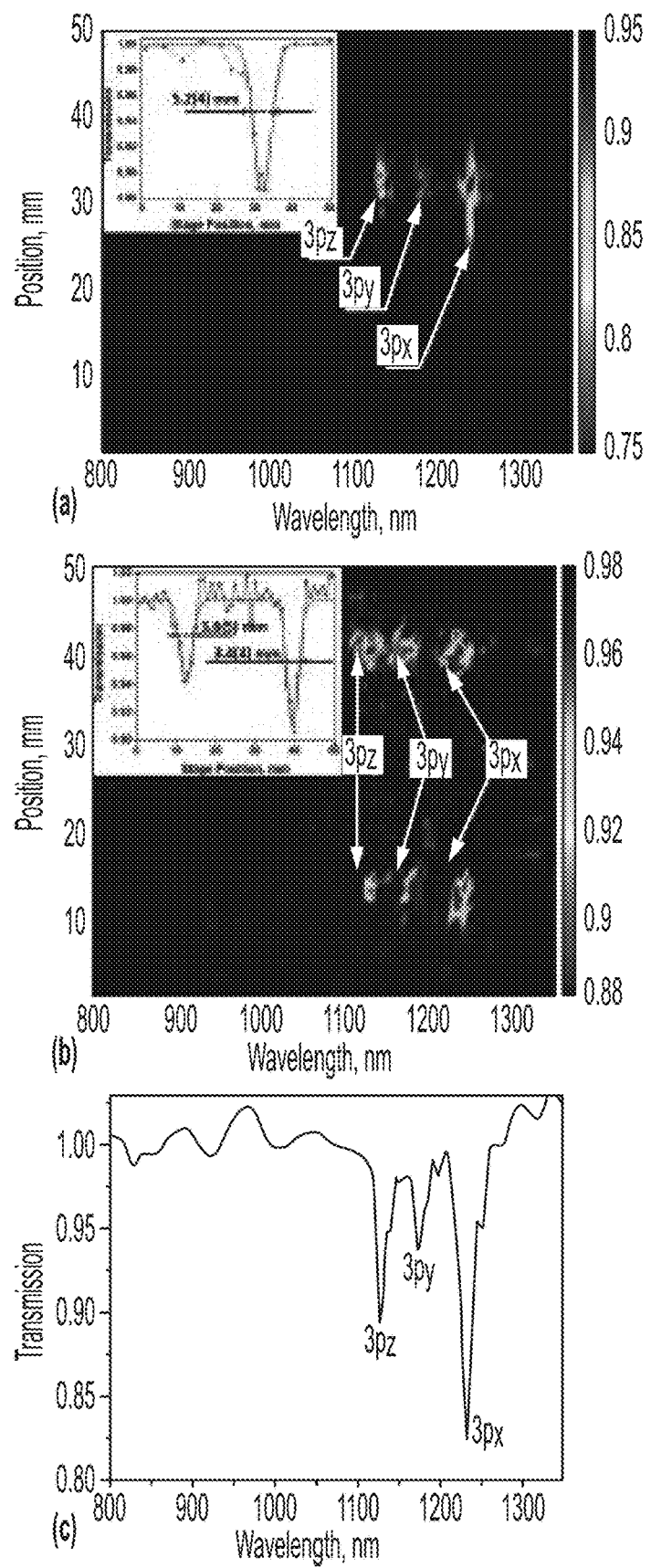
FIG. 3 is an exemplary graph.

FIG. 3 illustrates measured transient absorption signals for acetone plumes probed 0.5 mm above the source. Shown are the two-dimensional spectra of the signal as a function of position and wavelength for a single plume, (a) and a double plume, (b). The wavelength spectrum summed over all positions, (c).

More specifically, the transient absorption spectrum acquired using one 2 mm acetone source yielded the two dimensional spectrum shown in FIG. 3(a). The experiment with two 0.5 mm acetone sources resulted in the spectrum shown in FIG. 3(b). The projection of the spectrum 2a on the wavelength coordinate (FIG. 3(c)) shows three absorbances centered at 1232, 1175, and 1125 nm, corresponding to energies of 1.006, 1.055, and 1.102 eV respectively (FIG. 3(b)). These features can be assigned to the 3 s→3 p x, 3 s→3 py, and 3 s→3 p z transitions based on the reported literature values of the energies of the 3 s, 3 px, 3 p, and 3 pz states of 6.35 eV, 7.36, 7.41, and 7.45 eV, respectively, above the ground state 18.

The projections of the combined spectra on the position coordinate reflect the concentration of acetone vapor along the pump beam propagation path. The curves can be fitted to Gaussians with FWHM=5.2(4) mm for the 2 mm acetone source (FIG. 3(a)) and FWHM=3.6(5), and 3.4(4) mm for the 0.5 mm acetone sources (FIG. 3(b)).

In order to determine the size of the acetone plumes the data are deconvoluted using the instrument function for our experiment. To determine the instrument function we performed time-resolved transient absorption measurements with co-propagating 195 nm pump and 1232 nm probe pulses. For co-propagating pulses the FWHM of the recorded transient absorption signal is not affected by the size of the plume and is given by the convolution $$I(\tau) = \frac{1}{2\pi\sigma_1\sigma_2}\int_{-\infty}^{\infty}\exp\left(-\frac{x^2}{2\sigma_1^2}\right)\exp\left(-\frac{(x-c\tau^2)}{2\sigma_2^2}\right)dx = \frac{1}{\sqrt{2\pi(\sigma_1^2+\sigma_2^2)}}\exp\left(\frac{c^2\tau^2}{2(\sigma_1^2+\sigma_2^2)}\right)$$

where c is the speed of light, T is the time delay between the pulses and σ1 and σ2 represent the spatial widths of the pump and the probe pulses. Ignoring the lifetime of the 3 s state of acetone since it is much smaller than the laser pulse duration we determined the FWHM of the instrument function as 27(1) ps.

For counter-propagating pump and probe pulses the instrument function is given by:

$$I(\tau) = \frac{1}{2\pi\sigma_1\sigma_2}\int_{-\infty}^{\infty}\exp\left(-\frac{(x+c\tau)^2}{2\sigma_1^2}\right)\exp\left(-\frac{(x-c\tau^2)}{2\sigma_2^2}\right)dx = \frac{1}{\sqrt{2\pi(\sigma_1^2+\sigma_2^2)}}\exp\left(\frac{c^2\tau^2}{(\sigma_1^2+\sigma_2^2)/2}\right)$$

As expected the FWHM of the instrument function for counter-propagating pulses is one half of that of the co-propagating pulses. We conclude that for our experiment the duration of the instrument function is 13.5(5) ps, which is equivalent to 2.0(1) mm of delay on the linear translation stage. The measured widths of the projections of the spectra on the position coordinate yields widths of the acetone plumes of 5.2 mm, and 3.6 and 3.4 mm for the single plume of the experiment of FIG. 2a and the double plume of 2b, respectively. Deconvoluting the instrument function yields widths of 4.8(4) mm, and 3.0(5) and 2.7(4) mm, respectively. Here we did not take into account the lifetime of the 3 s state in acetone as well as the fact that the UV light is attenuated as it propagates through the plumes.

Assuming that the openings in the holes of the experiment with two acetone plumes are identical, and that the beam traverses exactly above the centers of both openings we can now use the Beer-Lambert law to estimate the sensitivity of the technique. The observed ratio of the areas of the two spectral dips is 0.69, suggesting that 69% of the initial pulse energy was transmitted through the plume generated by the first opening. This corresponds to the absorbance of the plume of 0.16. A separate measurement of the laser pulse energy before and after the plum produced by one vial of acetone with 0.5 mm opening confirmed that about 30% of the light is absorbed by the acetone vapor. We estimate acetone's absorption cross section as 2.88e-17 cm2 by digitizing data taking the average. This gives a molar extinction coefficient of 7500 l·mol$^{-1}$·cm$^{-1}$. The path length of the acetone plume was taken to be 2.7 mm as discussed above. With these parameters the Beer-Lambert law yields a concentration of the acetone vapor near the opening as 8e-5 mol/l. The amplitude of the dip in the transient absorption spectrum is on the order of 10%. The noise level in our experiment is ~1%. Consequently we estimate the sensitivity of our setup as 8e-6 mol/l, which is equivalent to 200 ppm, for the given path length of 2.7 mm. Assuming a laser beam diameter of 0.7 mm, the total number of molecules that were probed is estimated to be 5.0·10 13, or 8.3·10$^{-11}$ mol.

In summary, the present invention is a method for imaging molecule-specific chemical vapor distributions with millimeter spatial resolution. The technique takes advantage of electronic transitions between molecular Rydberg states that are characterized by large absorption cross-sections and highly resolved and molecule-specific spectra. BTAS allows for high spatial resolution, with a limit that is in the present setup determined mostly by the laser pulse duration.

Various modifications of the technique may be made. For example, by utilizing supercontinuum probe pulses the necessity to scan the probe laser pulse wavelength can be avoided. To avoid scanning the time delay between the pump and the probe pulse one could utilize a very long duration probe pulse (microseconds) and detect the dip in the intensity of the returned signal. The position of the chemical plume is only determined by the time between the emission of the pump pulse and the detection of the dip in the returned signal. Finally, RFS can be utilized in combination with traditional DIAL.

Exemplary Experimental Details

One experimental setup consists of two OPAs pumped by a 10 Hz, 21 ps, 70 mJ Nd:YAG laser (Ekspla PL2251C) and a spectrometer (FIG. 1). The Nd:YAG pulses are upconverted to produce 532 nm, 355 nm, and 266 nm pulses. 355 nm pulses and 532 nm pulses are utilized for pumping the OPAs (Ekspla PG403A-SH and Ekspla PG501-DFG1 respectively). 266 nm pulses are utilized to generate 195 nm, 35 µJ pulses via frequency mixing with 730.5 nm photons produced by the 532 nm pumped OPA. The 195 nm photons are utilized to excite acetone to the 3s Rydberg state while the output of the 355 nm pumped OPA produces NIR pulses that served as a probe for transitions between the 3 s and the 3 px, 3 py, and 3 pz Rydberg states (FIG. 2). The energy of the probe pulse is ~170 µJ. Using a lens with a focal length of 750 mm, the IR beam is weakly focused onto a beam block that is located behind the sample at a distance of ~500 mm from the focusing lens. The 195 nm beam is also slightly focused and directed towards the sample. The 195 nm beam diameter at the sample is ~0.7 mm which corresponds to laser power density of ~1·10$^9$ W/cm$^2$. The 195 nm beam is time delayed with respect to the IR pulse using a linear stage. Since the NIR pulse gets scattered in all directions when hitting the beam block we utilized a series of irises set before the detector to filter out the NIR photons moving along the paths different from the path of the 195 nm pulses.

In summary, the detection and identification of chemical vapors from a distance is important in numerous settings. The present invention provides an instrument that is capable of detecting vapors from a distance and that provides identification of the molecular compound as well as a read-out of the 3-dimensional position.

The instrument uses two laser beams. Number 1 is a pulsed laser emanating from the instrument propagates in the air. It is tuned to the wavelength at which a target chemical absorbs, or it is a broadband light that covers multiple wavelengths and can excite multiple chemicals. Pulses produced by laser 1 bring the molecules to an excited state.

The laser beam number 2 is used to probe target chemicals via transient absorption spectroscopy. The beam emanates from the instrument and is either pulsed or continuous. It propagates until, in the distance, it hits an object, or some other phase such as a liquid, smoke or scattering vapor, which scatters the light. Laser 2 is either collinear with the laser 1 beam or is projected to the same spot on the object that scatters the light. Some of the photons produced by laser 2 will propagate (upon scattering) along the laser beam 1 but in the reverse direction.

The instrument detects the back-scattered light of laser 2 and analyzes for characteristic absorption wavelengths that identify the vapor. It also analyzes the timing pattern with reference to the pulsed excitation beam 1, which reveals the distance at which the target chemical was detected. An analysis of the spectrum and time pattern therefore provides the chemical analysis and three-dimensional position of the vapors covered by the beams.

If the environment has sufficient light at the desired wavelength then this environmental light can be used instead of laser beam number 2.

The optical transitions involved can be transitions between electronic states or transitions between other molecular states.

The instrumentation can provide one or more of the following advantages.

It is independent on the shape of the reflection geometries. Solid or liquid surfaces work; smoke works as well. Position of the chemical is determined by the time delay between the pump pulse and a dip in the spectrum.

The spectrum and the position of the chemical can be revealed using a single pulse. No need to perform wavelength scan.

The detection range is only limited by the atmospheric extinction of the UV radiation. (100 s of meters for 260-250 nm radiation). ~10 m for 195-200 nm radiation.

High selectivity: two electronic transitions are probed.

The detection is performed in the wavelength range for which highly sensitive detectors are readily available.

Large cross-sections of Rydberg transitions result in high sensitivity of the technique.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A system comprising:
   a first laser beam comprising a pulsed laser emanating from the instrument propagates in the air, wherein the first laser beam is a broadband light that covers multiple wavelengths and excites multiple chemicals, its pulses bringing molecules to an excited state;
   a second laser beam used to probe target chemicals by transient absorption spectroscopy,
   wherein the second laser beam is pulsed or continuous, and propagates until, in a distance, it hits an object, or other phase that scatters the light,
   wherein the second laser beam is collinear with the first laser beam or is projected to the same spot on the object that scatters the light causing some of the photons produced by the second laser beam to propagate upon scattering along the first laser beam but in a reverse direction; and
   a detector, the detector detecting the back-scattered light of the second laser beam and analyzing it for characteristic absorption wavelengths that identify molecular compounds in a vapor.

2. The system of claim 1 wherein the phase is a liquid, solid, smoke or scattering vapor.

3. The system of claim 1 wherein the detector is configured to analyze a timing pattern with reference to a pulsed excitation of the first laser beam, which reveals a distance at which the identified molecular compounds were detected.

4. A system comprising:
   a first laser beam comprising a pulsed laser emanating from the instrument propagates in the air, wherein the first lase beam is tuned to the wavelength at which a target chemical absorbs, its pulses bringing molecules to an excited state;
   a second laser beam used to probe target chemicals by transient absorption spectroscopy, wherein the second laser beam is pulsed or continuous, the second laser beam propagating until, in a distance, it hits an object, or other phase that scatters the light,
   wherein the second laser beam is collinear with the first laser beam or is projected to the same spot on the object that scatters the light causing some of the photons produced by the second laser beam to propagate upon scattering along the first laser beam but in a reverse direction ; and
   a detector, the detector detecting the back-scattered light of the second laser beam and analyzes it for characteristic absorption wavelengths that identify molecular compounds in a vapor.

5. The system of claim 4 wherein the phase is a liquid, solid, smoke or scattering vapor.

6. The system of claim 4 wherein the detector is configured to analyze a timing pattern with reference to a pulsed excitation of the first laser beam, which reveals a distance at which the identified molecular compounds were detected.

* * * * *